United States Patent [19]
Kildal et al.

[11] Patent Number: 5,061,341
[45] Date of Patent: Oct. 29, 1991

[54] LASER-ABLATING A MARKING IN A COATING ON PLASTIC ARTICLES

[75] Inventors: Maurice A. Kildal, Webster; Arthur P. Chipouras, Rochester, both of N.Y.

[73] Assignee: Eastman Kodak Company, Rochester, N.Y.

[21] Appl. No.: 470,187

[22] Filed: Jan. 25, 1990

[51] Int. Cl.$^5$ .......................... B05D 3/06; B44C 1/22; B23K 26/00
[52] U.S. Cl. .................................. 156/632; 156/643; 427/53.1; 427/54.1; 427/56.1; 219/121.69
[58] Field of Search .................... 427/53.1, 54.1, 56.1, 427/55; 346/76 L; 156/643, 632; 219/121.65, 121.68, 121.69, 121.78

[56] References Cited

U.S. PATENT DOCUMENTS

| | | | |
|---|---|---|---|
| 4,245,003 | 1/1981 | Oransky et al. | 427/53.1 |
| 4,323,755 | 4/1982 | Nierenberg | 219/121 |
| 4,514,456 | 4/1985 | Deal et al. | 427/53.1 |
| 4,515,867 | 5/1985 | Bleacher et al. | 427/53.1 |
| 4,588,674 | 5/1986 | Stewart et al. | 346/76 L |
| 4,639,745 | 1/1987 | Matsui et al. | 346/76 L |
| 4,865,873 | 9/1989 | Cole, Jr. et al. | 427/53.1 |
| 4,939,012 | 7/1990 | Dust et al. | 346/76 L |

FOREIGN PATENT DOCUMENTS 61-61192  3/1986  Japan .
2076585  12/1981  United Kingdom .

OTHER PUBLICATIONS

SME Technical Paper, "Image Micro-Machining with Tea $CO_2$ Lasers," 1975.

*Primary Examiner*—Shrive Beck
*Assistant Examiner*—M. L. Padgett
*Attorney, Agent, or Firm*—Dana M. Schmidt

[57] ABSTRACT

There is disclosed a method of laser-marking plastic articles without unduly damaging the plastic. The method comprises coating the plastic with a contrasting color layer, and intermediate the color layer and the plastic, a protective layer of a dried coverage of at least 1.5 g/m$^2$.

Optionally, the ablation can be carried out beyond the stripe portion to be marked, to clear away any debris from the white support that otherwise can be left behind by the ablation.

10 Claims, 1 Drawing Sheet

LASER-ABLATING A MARKING IN A COATING ON PLASTIC ARTICLES

FIELD OF THE INVENTION

This invention relates to a process useful in marking plastic articles, such as thin plastic slides, with a bar code.

BACKGROUND OF THE INVENTION

It is customary to provide bar codes on dried, slide-like test elements used in analyzers to test for analytes of liquids. The bar-code information provides machine-readable information such as the type of assay for that element, and optionally, calibration data needed to calibrate that particular test element.

The test element body is typically a plastic material, such as polystyrene. This underlying material is not an easy material to print on. Thus, conventional printing techniques have been difficult to use as they do not always provide a sufficiently contrasting color. A preferred format is to use a white test element, hereinafter "slide", with a dark or black ink. Although flexographic printing of a black ink has been used, this process suffers the disadvantages of high cost, the need to print in continuous web format and possible voids in the printing.

Therefore, there has been a need prior to this invention to develop a method of marking the plastic slides by a technique other than printing.

Laser marking has been developed for articles in general, as described, for example, in U.S. Pat. Nos. 4,323,755 and 4,515,867. However, there is a problem in applying this technique to plastic articles in general, and particularly to polystyrene articles. That is, the coating that is to be ablated away to reveal the contrasting color of the native plastic underneath, is not readily ablatable without damaging the plastic with the laser. That is, the contrasting color coating adheres so well to the plastic that the last molecules of the color do not readily ablate without unduly damaging the plastic. This is particularly a problem with certain plastic articles, such as polystyrene slides, that contain the dried reagents used to assay for liquid analytes. That is, these plastic articles, if ablated so as to remove some of the plastic, will tend to flow so as to become warped or distorted.

It is not entirely clear what the mechanism is for the tenacious binding of the contrast color coating to the plastic. It may be solvent attack of the plastic, inherent porosity of the plastic surface, or even a binding that is enhanced by the heat of the ablation process. It appears to occur whether or not the contrast color coating is solvent-based or aqueous-based.

Thus, prior to this invention the need for a non-printing marking technique for use on plastic articles was not met by laser-ablation techniques.

An additional problem arising from marking by laser ablation is the tendency of the laser process to cause redepositing of the contrast coating in other areas. For this reason, laser marking of lot numbers on bottles has in the past used large dark areas and an ablation in the middle of that area, so that the ablation debris falls onto the bordering dark area, rather than a white area. The disadvantage of this approach is that considerable area is wasted in the large dark area that is required.

Thus, a further problem has been to mark any substance with laser ablation, without leaving debris behind in white areas and without requiring large areas of dark borders.

SUMMARY OF THE INVENTION

We have discovered a method of laser-marking thin plastic articles that avoids the above-detailed problems.

More specifically, in accord with one aspect of the invention there is provided a method of preventing damage to a pigmented plastic article when ink on the article is ablated away to form an image. The method comprises the steps of:

a) coating the plastic article with a first layer of binder and solvent with a sufficient wet-laydown to provide a dried coating coverage of at least about 1.5 g/m$^2$, b) drying the first layer, c) coating the first layer and plastic with a colored coating comprising a binder and a contrast color opposite to that of the pigment of the plastic article, with a wet-laydown sufficient to give a dried thickness sufficient to produce a minimum print contrast of at least 0.75 compared to the color of the plastic article, d) drying the colored coating, and e) in predetermined portions that form an image, ablating away all of the colored coating and at least some of the first layer, using a laser.

In accord with a second aspect of the invention, there is provided a method of preventing redepositing onto a support, material of a dark coating that is laser-ablated from the support, the method comprising the steps of ablating away a dark coating on the support in areas needed for information recording, and ablating away additional portions of the coating beyond said areas of information recording so that the additional portions are free of redeposited material.

Accordingly, is it an advantageous feature of the invention that markings such as bar-code labeling can easily be placed on plastic articles using a laser.

It is a related advantageous feature of the invention that laser ablation can be used in such a process without distorting the plastic article.

It is a further advantageous feature that such ablation can be done without requiring a large dark border around the information area.

Other advantageous features will become apparent upon reference to the following Description of the Preferred Embodiments, when read in light of the attached drawings.

DESCRIPTION OF THE PREFERRED EMBODIMENTS

Figure 1:
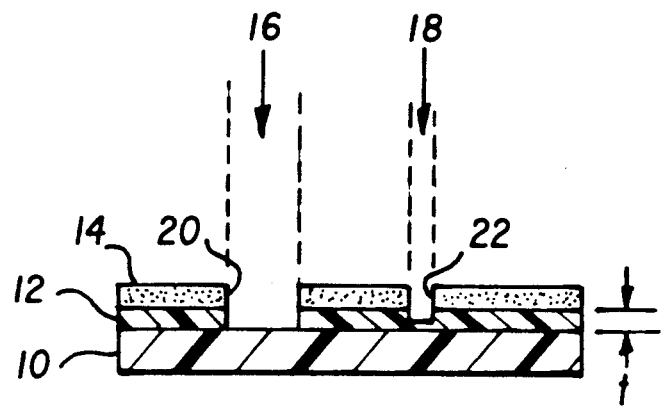
FIG. 1 is an enlarged elevational view in section of a plastic article marked with a laser in accordance with one aspect of the invention.

The invention is hereinafter described with respect to the preferred embodiments, wherein specific preferred coatings are applied to polystyrene slides used for liquid assay, using preferred lasers to ablate away dark coatings to form bar codes on a white support. In addition, it is applicable to any coating formulations, white or dark, applied to any plastic articles for selective removal by any type of laser to provide any kind of marking or image, provided the intermediate layer of the invention is used to keep from distorting the underlying plastic.

Thus, the preferred plastic articles to be bar-coded are polystyrene liquid assay slides. Highly preferred are the slides available from Eastman Kodak Company under the trademark "Ektachem". Such slides are preferably manufactured to be white in color, so that the bar code is formed in black as the contrasting color. However, the slide color can be formulated with a black pigment, so that the bar codes are formed from an applied layer that has a contrasting white color. It will be further apparent that the contrasting colors need not be pure white and pure black. Rather, what is important is that the colors be selected so that a minimum print contrast of at least 0.75 is provided between the bar code and what is exposed under the bar code coating. This "minimum print contrast" is determined by measuring the white reflectance and the dark reflectance on a reflectometer available from MacBeth under the tradename "PC Meter II", and using the formula "print contrast" = (white reflectance-dark reflectance)/white reflectance.

Any dark coating can be applied onto the white slide to provide the material to be ablated by the laser, so long as the minimum print contrast noted above is achieved. Highly preferred are conventional black inks or coatings containing carbon black or a black dye. Both solvent-based and aqueous-based coatings are useful. In fact, one of the two layers can be either solvent or aqueous based and the other layer aqueous or solvent based, respectively. The dark coating can be applied to either completely cover the slide, or to only partially cover it. The coverage is not critical, provided that it provide a reflectance of the dark coating, when read at 700 nm, that is less than about 5%. Excessive thicknesses (those greater than about 10 g/m$^2$) should be avoided, as these require so much more laser ablation to remove.

Because the black coatings are conventional, further details are unnecessary.

In accordance with the invention, an intermediate layer is applied between the plastic slide and the dark coating, of sufficient thickness that the ablation of the last-remaining dark coating at any one place, will ablate away at least some of the intermediate layer, without unduly distorting the underlying plastic. It is unimportant whether this intermediate layer is applied all at once or in layers, provided this thickness is achieved.

The actual minimum thickness required will vary, depending upon certain factors. That is, the power and effectiveness of the laser that is used will vary the thickness of the ablation that occurs—the more powerful the laser, the thicker the intermediate layer that might be required, since more of the intermediate layer may be ablated. Another factor is the ability of the intermediate layer to be ablated—if a binder is used that is more difficult to ablate, less thickness is required.

Using the preferred coating and laser described, the preferred minimum thickness of the intermediate layer is that which provides a dry coverage of about 1.5 g/m$^2$. Highly preferred is a minimum of from 3 to 6 g/m$^2$ dry coverage. This insures that the dark coating is spaced sufficiently far from the plastic, and damage, if any, to the plastic from the laser is negligible.

In coating this layer, care must be taken to avoid causing the underlying plastic, particularly polystyrene, from curling. This is caused by the action of certain solvents, namely any solvent that will attack the plastic in question. For polystyrene, this means solvents that are non-alcoholic and non-water need to be used with care. Highly preferred solvents for a solvent-based intermediate layer are ethyl acetate and n-propyl acetate, and these should be used in amounts that are less than about 20 g/m$^2$.

Thus, the intermediate layer will comprise a binder, a solvent for the binder, and optionally a pigment comparable in color to that of the underlying plastic, for example, titanium dioxide. If a pigment is present, preferably it is present in amounts that range from one-half to twice the amount of binder. If no pigment is present, preferably the binder is transparent.

Highly preferred binders for the intermediate layer include cellulose nitrate, polyalkyl methacrylates such as poly(ethyl methacrylate), and copolyesters such as of diethylene glycol and phthalates used alone or together. Useful example of copolyesters include dimethyl isophthalate and dimethyl sodiosulfoisophthalate. Such preferred copolyesters include those obtainable from Tennessee Eastman Company under the tradenames AQ55 and AQ29. The former of these also includes 1,4-cyclohexanedimethanol as an alcohol component. The binder can be a mixture of these, the ratio of which is not critical.

The above-mentioned preferred binders are also useful in an aqueous-based intermediate layer.

In applying the dark coating over the intermediate layer, if the solvent of the former is effective against the latter, care must be taken to not completely disturb the underlying layer. One method of doing this is to increase the coating thickness of the intermediate layer.

Thus, the intermediate layer can be considerably thicker than 5 g/m$^2$, so long as the solvent coverage is less than that which is effective to cause curl, as noted above. Highly preferred maximum thicknesses of the intermediate layer are those that produce a maximum dry coverage that is about 10 g/m$^2$. More than this thickness suffers the disadvantages of too much flaking of the layer due to finishing operations, and too much drying time.

Optionally, a final clear protective coating of, for example, a layer of the binder used in the intermediate layer can be applied to the dark layer, preferably in amounts no greater than about 2.0 g/m$^2$ dried coverage.

Most preferably, the intermediate layer is dried before applying the dark coating. Any drying protocol can be used.

Any coating technique can be used to apply either or both the intermediate layer and the final colored layer that has the contrasting color. For example, conventional extrusion hopper coating, multi-slot dies, or multi-station hoppers can be used, preferably using a single pass to make each of the two layers.

Turning next to the laser that is used, any laser capable of ablating away the dark coating without ablating away all of the intermediate layer is useful. Highly preferred for such purposes are conventional pulsed lasers that deliver high energy in one or more pulses on a short period of time. Most preferred are those that deliver at least 4 joules per $10^{-6}$ sec over an area of about 1.2 cm$^2$, such as CO$_2$ lasers. Conventional TEA CO$_2$ lasers are well-known to be useful for this purpose, for example, as described in the article "Image Micromachining with TEA CO$_2$ Lasers", Nelson et al, printed in 1975 in the SME Technical Paper identified as MR75-584. Still other useful lasers that deliver useful energy include pulsed YAG and scanning beam lasers such as continuous $CO_2$ or Q switched YAG lasers.

WORKING EXAMPLES

The following examples further illustrate the invention. They are not in any way an exhaustive listing of the possibilities:

EXAMPLE 1

SOLVENT BASED PIGMENTED COATING

A polystyrene slide having a thickness of about 1 mm was manufactured so as to be white in color. Over this slide, an intermediate protective layer was coated as follows:

A wet-laydown of 12 $g/m^2$ was applied by an extrusion hopper of the following composition:

| Function | Material | Wet Coverage ($g/m^2$) |
| --- | --- | --- |
| Solvent | Water | 6 |
| Pigment | $TiO_2$ | 2 |
| Binder | Copolyester AQ55 | 4 |

This was dried by heating in an oven at about 65° C. for about 7.5 minutes to give a dried coverage of about 6 $g/m^2$. The resulting intermediate layer had a final dried coverage of about 6 $g/m^2$.

Thereafter, a black layer was applied using a similar hopper, at a wet-laydown of about 3 $g/m^2$ of the following composition:

| Function | Material | Coverage ($g/m^2$) |
| --- | --- | --- |
| Solvent | isopropyl acetate | 2 |
| Pigment | carbon black | 0.4 |
| Binder | cellulose nitrate and poly(ethyl methacrylate) | 0.6 |
| Other Addenda | a plasticizer | less than 0.1 |

This was dried by heating in an oven at about 65° C. for about 3 min., to give a dried coverage of about 1 $g/m^2$.

A protective overcoat of the same binder was applied to the black layer by applying a wet-laydown of 4 $g/m^2$ using a weight % concentration of 40% in isopropyl acetate. This was dried by heating in an oven at 65° C. for 3 min.

The finished article was then processed in a TEA $CO_2$ laser as follows:

It was mounted at a distance of about 305 mm from the emitting point of the laser, with a bar-code mask positioned in between. The mask exposed an area of about 1.2 $cm^2$. The laser was fired with a pulse of about 5 joules for about $1 \times 10^{-6}$ sec. This was effective to remove all of the black layer on the slide where exposed, and some of the intermediate layer.

EXAMPLE 2

Aqueous Based Coatings

The process of Example 1 was identically repeated, except as follows:

The intermediate layer was applied identically.

The colored (black) layer applied over the intermediate layer was applied as a wet-laydown coverage of 2.4 $g/m^2$ of the following composition:

| Function | Material | Coverage ($g/m^2$) |
| --- | --- | --- |
| Solvent | Water | 1.8 |
| Binder | copolyester AQ55 | 0.3 |
| Pigment | carbon black | 0.3 |

Drying was done in an oven for about 3 min. at about 65° C. to produce a final layer having a dried coverage of about 0.6 $g/m^2$.

The above-described method is further illustrated in FIG. 1. A plastic support, such as a white polystyrene slide 10, has an intermediate layer 12 coated thereon, and a black coating 14 is applied thereover. A laser, not shown, is used to send beams, arrows 16 and 18, through a mask, not shown, to remove portions 20, 22 from coating 14. In addition, all of the layer 12 underlying portion 20 was removed, but only a portion of layer 12 is removed by the laser under portion 22. Thus, some of the plastic 10 is exposed to the action of laser beam 16. However, the thickness "t" of layer 12 is selected to prevent any significant distortion of plastic 10. As noted, "t" is at least sufficient to give a dried coverage of about 1.5 $g/m^2$.

Figure 2:
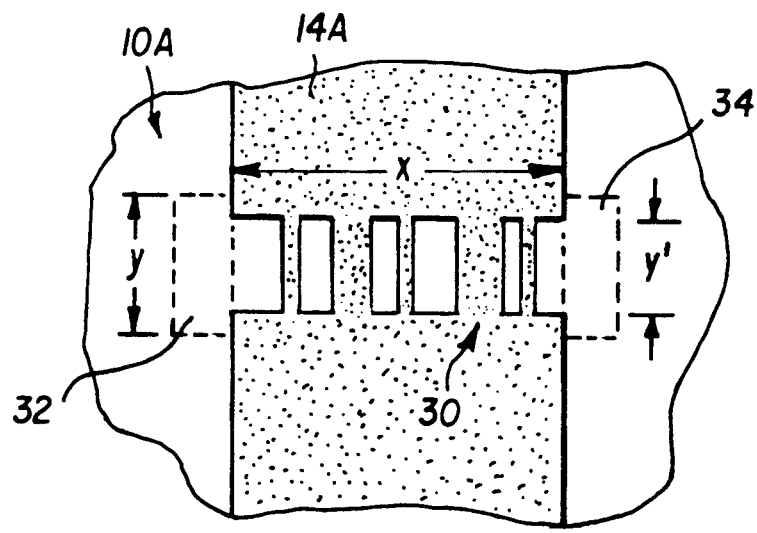
FIG. 2 is a fragmentary plan view of a marking made by a laser in accordance with another aspect of the invention.

In addition to the process noted above, it is a preferred option to ablate coating 14, FIG. 1, in such a way as to minimize the amount of dust and dirt from coating 14 that falls back onto white or clear layer 12. That is, there tends to be a scattering, during laser ablation, of the parts of coating 14, which ends up as smudges, dirt or discoloration on the white or transparent layer 12. The process for correcting this is illustrated in FIG. 2. Parts similar to those previously described bear the same reference numeral to which the distinguishing suffix A is applied.

That is, a black stripe 14A is applied as a coating to any suitable support 10A (with or without an intermediate layer as described above). The support is white, so that any debris that falls outside the black stripe will be noticeable. The bar code 30 or other marking is formed widthwise across the stripe, so that laser ablation using prior art techniques stops just outside the edges of the stripe. That is, the laser operates in the prior art only for a distance "x". However, in accord with the invention the mask used with the laser provides for additional ablation in the areas 32 and 34 outlined by a dotted line. This includes a dimension "y" that preferably exceeds the height y' of the bar code 30. It is important that areas 32 and 34 at least touch stripe 14A, and preferably, overlap the stripe. As a result, any debris that might fall into area 32 or 34 is ablated away. Preferably, the width of each of areas 32 and 34 is about 4 mm and the height y is about 6 mm. For comparison, y' is typically only 4 mm.

Figure 3:
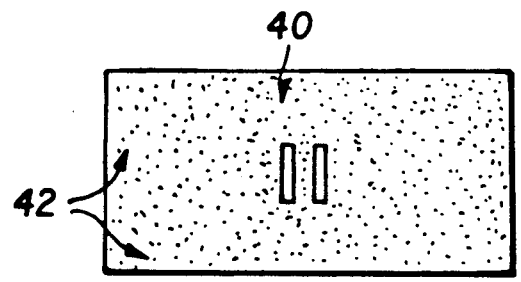
FIG. 3 is a plan view of a prior art laser marking, included for comparison.

FIG. 3 illustrates the prior art approach. The number "11" is ablated by laser in black strip 40, leaving large black border areas 42 all around the marking. As a result, the number cannot be formed close to the edge of the stripe, and much area is wasted in the borders.

The invention has been described in detail with particular reference to certain preferred embodiments thereof, but it will be understood that variations and modifications can be effected within the spirit and scope of the invention.

What is claimed is:

1. A method of preventing damage to a pigmented plastic article when ink on said article is ablated away to form an image, the method comprising the steps of:

a) coating the plastic article with a first layer of binder and solvent with a sufficient wet-laydown to provide a dried coating coverage of from 3 to 10 g/m$^2$, b) drying said first layer, c) coating said first layer and plastic article with a colored coating comprising a binder and a contrast color opposite to that of the pigment of said plastic article, with a wet-laydown sufficient to give a dried thickness sufficient to produce a minimum print contrast of at least 0.75 compared to the color of said plastic article, d) drying said colored coating, and e) in predetermined portions that form an image, ablating away all of said colored coating and at least some of said first layer, by exposing the coated side of said article using a laser.

2. A method of preventing damage to a pigmented plastic article when ink on said article is ablated away to form a bar-code, the method comprising the steps of:

a) coating the plastic article with a first layer of binder and solvent with a sufficient wet-laydown to provide a dried coating coverage of from 3 to 10 g/m$^2$, b) drying said first layer, c) coating said first layer and plastic article with a colored coating comprising a binder and a contrast color opposite to that of the pigment of said plastic article, with a wet-laydown sufficient to give a dried thickness sufficient to produce a minimum print contrast of at least about 0.75 compared to the color of said plastic article, d) drying said colored coating, and e) in predetermined portions forming a bar-code, ablating away all of said colored coating and at least some of said first layer, by exposing the coated side of said article using a laser.

3. A method of preventing damage to pigmented polystyrene articles when ink on said articles is ablated away to form an image, the method comprising the steps of:

a) coating the article with a first layer of binder and solvent with a sufficient wet-laydown to provide a dried coating coverage of from 3 to 10 g/m$^2$, b) drying said first layer, c) coating said first layer and article with a colored coating comprising a binder and a contrast color opposite to that of the pigment of said polystyrene article, with a wet-laydown sufficient to give a dried thickness sufficient to produce a minimum print contrast of at least about 0.75 compared to the color of said polystyrene article, d) drying said colored coating, and e) in predetermined portions that form an image, ablating away all of said colored coating and at least some of said first layer, by exposing the coated side of said article using a laser.

4. A method as defined in claim 1, wherein said ablating step is done at portions effective to form a bar code on the polystyrene article.

5. A method of preventing damage to a pigmented polystyrene test element when ink on said test element is ablated away to form an image, the method comprising the steps of:

a) coating the test element with a layer of binder and solvent with a sufficient wet-laydown to provide a dried coating coverage of from 3 to 10 g/m$^2$, b) drying said binder coating, c) coating said binder coating and test element with a colored coating comprising a binder and a contrast color opposite to that of the pigment of said test element, with a wet-laydown sufficient to give a dried thickness sufficient to produce a minimum print contrast of at least about 0.75 compared to the color of said test element body, d) drying said colored coating, and e) in predetermined portions forming an image, ablating away all of said colored coating and at least some of said first layer, by exposing the coated side of said test element using a laser.

6. A method as defined in claim 1, 2, 3, or 5, wherein said colored coating of step c) contains a black pigment.

7. A method as defined in claim 1, 2, 3, or 5, wherein said dried coverage is between about 3 g/m$^2$ and about 6 g/m$^2$.

8. A method as defined in claim 1, 2, 3 or 5, wherein said binder of each of said coatings is a binder capable of being ablated by said laser.

9. A method as defined in claim 1, wherein said binder comprises cellulose nitrate, polyalkyl methacrylate, or a copolyester of diethylene glycol and an isophthalate.

10. A method as defined in claim 1, 2, 3 or 5, wherein said laser is operated in step e) at at least 3.0 joules/10$^{-6}$ sec/cm$^2$.

* * * * *

UNITED STATES PATENT AND TRADEMARK OFFICE
CERTIFICATE OF CORRECTION

PATENT NO. : 5,061,341

DATED : October 29, 1991

INVENTOR(S) : Maurice A. Kildal, et al.

It is certified that error appears in the above-identified patent and that said Letters Patent is hereby corrected as shown below:

Column 8, line 10, "1" should read --3--.

Signed and Sealed this

Twenty-third Day of March, 1993

Attest:

STEPHEN G. KUNIN

*Attesting Officer*     *Acting Commissioner of Patents and Trademarks*